United States Patent
Ransom

(10) Patent No.: US 8,568,523 B1
(45) Date of Patent: Oct. 29, 2013

(54) METHOD OF TREATING TIRE SURFACES

(76) Inventor: Roland E. Ransom, Clemmons, NC (US)

( * ) Notice: Subject to any disclaimer, the term of this patent is extended or adjusted under 35 U.S.C. 154(b) by 285 days.

(21) Appl. No.: 12/927,622

(22) Filed: Nov. 19, 2010

Related U.S. Application Data

(63) Continuation-in-part of application No. 11/634,353, filed on Dec. 5, 2006, now Pat. No. 7,837,778.

(60) Provisional application No. 60/742,016, filed on Dec. 5, 2005.

(51) Int. Cl.
*C09K 3/14* (2006.01)
*C09K 3/18* (2006.01)
*E04G 1/00* (2006.01)

(52) U.S. Cl.
USPC .......... 106/36; 252/182.11; 252/182.23; 252/182.28; 106/287.23; 106/287.35

(58) Field of Classification Search
USPC .......... 106/36, 287.23, 287.35; 152/151, 167, 152/185, 208; 156/308.6, 305; 252/182.11, 252/182.23, 182.28; 524/315, 314, 306, 524/381; 427/384; 510/189
See application file for complete search history.

(56) References Cited

U.S. PATENT DOCUMENTS

| | | | | |
|---|---|---|---|---|
| 2,340,264 A * | 1/1944 | Freeman | ....................... | 264/236 |
| 2,921,918 A * | 1/1960 | Mooney et al. | ................ | 523/150 |
| 3,271,170 A * | 9/1966 | Ahlberg et al. | ................. | 106/36 |
| 3,387,996 A * | 6/1968 | Tolliver | .......................... | 428/378 |
| 3,399,706 A * | 9/1968 | Prusha | ......................... | 152/211 |
| 3,783,002 A * | 1/1974 | Purcell et al. | ............... | 427/374.2 |
| 3,968,198 A * | 7/1976 | Honda et al. | ................... | 264/343 |
| 4,261,407 A * | 4/1981 | Vosnick | ......................... | 152/450 |
| 4,567,928 A * | 2/1986 | Takiguchi | ................... | 152/209.1 |
| 5,540,767 A * | 7/1996 | Ronlan | ..................... | 106/287.35 |
| 6,858,664 B2 * | 2/2005 | Wentworth et al. | ............ | 524/315 |
| 7,285,588 B2 * | 10/2007 | O'Rourke et al. | ............. | 524/321 |
| 7,378,032 B2 * | 5/2008 | Ueda et al. | .................... | 252/8.57 |
| 7,837,778 B1 * | 11/2010 | Ransom | .......................... | 106/36 |
| 2004/0144462 A1* | 7/2004 | Zanzig et al. | ................. | 152/151 |
| 2005/0153138 A1* | 7/2005 | Halladay | ....................... | 428/421 |

FOREIGN PATENT DOCUMENTS

| | | | |
|---|---|---|---|
| FR | 2397131 A | * | 3/1979 |
| JP | 53014897 A | * | 2/1978 |
| WO | WO 9507967 A1 | * | 3/1995 |

OTHER PUBLICATIONS

FR 2397131 Derwent abstract, Mar. 1979.*
JP 53014897 Derwent abstract, Feb. 1978.*

\* cited by examiner

*Primary Examiner* — Mark Eashoo
*Assistant Examiner* — Jane L Stanley
(74) *Attorney, Agent, or Firm* — Robert W. Pitts

(57) ABSTRACT

This application is directed to a method of treating tires so that the tires will have better performance, especially when used for racing. The method disclosed herein is especially suited for use in go kart racing, although the method can be used for other applications in which the adhesion and hardness of tires and dynamic coefficient of friction, after their manufacture is to be altered. The method also includes cleaning steps and formulations. This method involves the selective use of various esters to alter tire characteristics as desired. The esters can be used in a process in which the exterior of the tire is cleaned by esters before application of an ester based tire treatment.

7 Claims, No Drawings

METHOD OF TREATING TIRE SURFACES

CROSS REFERENCE TO PRIOR CO-PENDING PATENT APPLICATIONS

This application claims is a continuation in part of prior U.S. patent application Ser. No. 11/634,353 filed Dec. 5, 2006 now U.S. Pat. No. 7,837,778 which in turn the benefit of prior co-pending U.S. Provisional Patent Application Ser. No. 60/742,016 filed Dec. 5, 2005, and the contents of that application are also incorporated herein by reference.

FIELD OF THE INVENTION

This invention relates to methods of using formulations including esters applied to tires after their manufacture to improve the performance of the tires, and especially to improve the racing performance of tires to which the esters have been applied.

BACKGROUND OF THE INVENTION

Tire treatments are used to modify tire performance, especially for racing, by the application of chemicals after manufacturing. The current method or art for modifying the performance of tires is to apply various liquid chemicals that are predominately petroleum distillates, and/or coal tar distillates mixed in various proportions. These prior art tire treatments include Methyl Naphthalene (a commercially available blend of 1-Methylnaphthalene, 2-Methylnaphthalene and Naphthalene), mineral spirits, lacquer thinner, toluene, Xylene, Creosote, DEET (diethyl toluamide), automatic transmission fluid, WD-40, Naphthenic Solvents, Naphthenic Oils, Paraffinic Solvents, Paraffinic Oils, Aromatic Solvents, Aromatic Oils, Ethyl-Benzene, and various commercial blends of these chemicals and blends.

Many of these chemicals, currently used as racing tire treatments, are known carcinogens, suspect carcinogens, mutagens, teratogens, marine pollutants, highly flammable, or comprise other environmental pollutants and/or combinations thereof. Many of these chemicals used in prior art racing tire treatments have little or no biodegradablility. Furthermore, many of these chemicals are routinely found in Superfund sites.

The desired modifications achieved by the use of these prior art chemicals may include lowering the durometer of the tire or alternatively to minimize the effect on durometer. At least some of these chemicals may be employed to clean the surface of the tire by removing foreign matter applied during manufacturing or clean the tire surface after the tire has been used, especially on a dirt track. At least some of these chemicals may be used to modify the adhesion of the tire to a given surface, including dirt, clay, asphalt, concrete or even surfaces that have been treated with a dried soft drink resin, such as dried Coca-Cola resin. Coca-Cola is a registered trademark of Coca-Cola Inc.

It is generally accepted that the above chemicals are to some degree effective. These chemicals and combinations thereof work in various ways and in combination of ways, all of which are not clearly understood.

One method is that solvents are chosen that are extremely good solvents for the components in the tires that are solvent soluble. The chosen solvents have a high enough vapor pressure so that they evaporate relatively quickly. During evaporation, these solvents draw chemicals out of the tires and leave other tire chemicals or components at a higher concentration than normal at the surface of an untreated tire. This gives a temporary advantage until the rubber with this higher concentration either wears off, or the temperature of the tire increases to a point that the chemicals at elevated levels themselves evaporate, or some combination of both.

Another method is to apply a neat or dilute chemical with lower volatility that mimics the components in the tires as supplied. This is the major use of Methylnaphthalene in treating tires. Other petroleum distillates and/or coal tar distillates are also employed to yield a similar effect.

Chemicals may be chosen because they purge the surface of loose particulate matter that may include tire particulate, clay, dirt or other matter that tires may pick up during racing or even in normal use.

In many cases, the methods employed for tire treatment reduce the life of the tire and the methods slowly destroy the structure or integrity of the composition of the tire.

The use of esters for prior art methods appears to be limited to phthalate esters.

SUMMARY OF THE INVENTION

This invention relies on the use of synthetic compounds having an ester structure to accomplish a desired result without the normal problems associated with traditional methods. The family of esters is so vast that every currently desired tire treatment effect can be accomplished and the detrimental effects associated with traditional techniques can be avoided. By proper selection, the treatments can be made free of carcinogens, suspect carcinogens, mutagens, teratogens, marine pollutants, poisons, other environmental pollutants and the flammability can be reduced.

Tires can be cleaned with esters that are water soluble.

The durometer of tires can be lowered using lower molecular weight esters and yet these esters can have a low enough vapor pressure to minimize their evaporation and adhesion of the tire can be improved.

Tires can be treated with esters so that the durometer is not modified and yet adhesion is improved.

Tires can have an application of correctly chosen esters so that the effects of a higher concentration of the actual components of the tire at the surface can be mimicked.

The tire life can be increased and performance improved.

DETAILED DESCRIPTION OF THE PREFERRED EMBODIMENTS

In this invention, formulations including esters have been applied to tires after their manufacture to improve the performance of the tires, and especially to improve the racing performance of tires to which the esters have been applied. It has been found that the application of esters and of formulations containing esters can improve the performance of tires. It has also been found that the addition of different esters can result in improvement of different tire performance characteristics. It has also been found that the addition of multiple esters as part of the same formulations can also result in performance enhancements. Furthermore, it has been found that the application of different formulations of esters, in separately applied coats can also be advantageous in improving the performance of tires.

This method of treating tire surfaces to modify performance includes the steps of: applying at least one ester selected from the group of esters consisting of monoesters, diesters, triesters, tetraesters, ester resins, polyesters, phosphate esters and phosphonate esters to a tire surface to vary the adhesion or bite of the tire to the road surface, and/or the tire life, and/or the tire performance and/or the tire hardness.

In practicing this method the group members monoesters, diesters, triesters, tetraesters include the esters of both hydrocarbyl monocarboxylic acid and hydrocarbyl polycarboxylic acids as well as hydrocarbyl monohydroxy alcohol and hydrocarbyl polyols.

According to aspects of this method the hydrocarbyl groups can be selected from straight chain, branched chain, or aromatic hydrocarbyl groups or admixtures thereof and may be saturated or unsaturated. The hydrocarbyl groups are predominantly composed of carbon and hydrogen but may contain one or more hetero atoms such as sulfur, oxygen, fluorine and nitrogen.

Group members including resin esters, oligomer esters and polyesters, are complex esters prepared from the mixtures of hydrocarbyl carboxylic acid and hydrocarbyl polycarboxylic acids as well as hydrocarbyl monohydroxy alcohol and hydrocarbyl polyols.

The hydrocarbyl groups can be selected from straight chain, branched chain, or aromatic hydrocarbyl groups or admixtures thereof and may be saturated or unsaturated. Hydrocarbyl groups can be predominantly composed of carbon and hydrogen but may contain one or more hetero atoms such as sulfur, oxygen, fluorine and nitrogen.

According to one aspect of this invention, the group member phosphate esters are selected from a group of esters consisting of hydrocarbyl phosphate ester free acids and nonionic hydrocarbyl phosphate esters.

The group member phosphonate esters can be selected from a group of esters consisting of hydrocarbyl phosphonate ester free acids, nonionic hydrocarbyl phosphonate esters, hydrocarbyl diphosphonate ester free acids and nonionic hydrocarbyl diphosphonate esters.

The following examples demonstrate improvements that have been demonstrated by the application of specific formulations.

Example No. 1

Cleaning Formulation and Method

This method is also used to clean tires. This composition or formulation is a water based cleaner that is used to clean tires that are either are to be treated with another tire treatment or will subsequently be treated. This composition will improve the way in which other tire treatments are absorbed, because the surface of the tire will be cleaner. This method employs the following formulation.

|  | Percentage by Weight |
|---|---|
| DOWANOL DPM-SOLVENT ETHER DPM | 3.00000 |
| DOWANOL PnP | 5.00000 |
| DOSS 70% | 1.00000 |
| STEOL CS_460 | 0.50000 |
| WATER | 85.50000 |
| ETHYLENE GLYCOL DIACETATE | 1.00000 |
| DIBASIC ESTER | 3.00000 |
| F3700 | 0.50000 |
| 4500 MW POLYACRYLATE Na SALT | 0.50000 |
| ** Total Percentage ** | 100.00000 |

DPM:
DIPROPYLENE GLYCOL MONOMETHYL ETHER (CAS No: 3459094_8)
SYN: DIPROPDXYMETHANOL, DPM, DIPROPYLENE GLYCOL METHYL ETHER, DPGME

PnP:
PROPDXYLATED n-PROPANOL (CAS No: 1569_01_3)
SYN: DOWANOL PnP, PROPYLENE GLYCOL n-PROPYL ETHER, PGnPE
DOSS:
DIOCTYL SULFOSUCCINATE 70% (CAS No. 577_11_7)
SYN: DIOCTYL SULFOSUCCINATE SODIUM SALT, DIOCTYL SODIUM SULPHOSUCCINATE
CS-460: SODIUM LAURETH SULFATE (CAS No. 9004_82_4)
SYN: ALCOHOL ETHOXYLATE SULFATE SODIUM SALT,
SODIUM POE LAURYL SULFATE POE n>3
WATER (CAS No. 7732_18_5) SYN: $H_2O$
ETHYLENE GLYCOL DIACETATE (CAS No. 111_55_7)
SYN: 1,2_DIACETOXYETHANE, 1,2_ETHANEDIOL DIACETATE,
ETHYLENE GLYCOL ACETATE, APTEX DONOR H_Plus
DBE—DIBASIC ESTER—DUPONT NAME FOR BLEND OF:
DIMETHYL GLUTURATE (CAS No: 1119_40_0)
DIMETHYL ADIPATE (CAS No: 627_93_0)
DIMETHYL SUCCINATE (CAS No: 106_65_0)
F3700:
MITSUBISHI IDENTIFIER FOR AMBIENT CURE PERFLUORO ALKYL ACRYLATE DISPERSION IN WATER (CAS No. PROPRIETARY)
454N:
4500 MW POLYACRYLATE Na SALT (CAS No. 9003_04_7)
SYN: SODIUM POLYACRYLATE This composition is water soluble and can be sprayed liberally on and removed with a rag to clean tires that have been run on a dirt track. This composition can be sprayed liberally on the tire, which is allowed to sit for 30 seconds to 5 minutes, and not more than 10 minutes. If the composition has been allowed to dry, and additional layer should be sprayed on the tire surface. The composition is wiped off with a rag, preferably in the form of a dry terry cloth towel. The tire should then be allowed to dry completely before another tire treatment is applied. This formulation can be used between racing heats. This composition has been found to be effective when used with racing vehicles that run on tracks that have dried syrup used on concert tracks, with sealer (lignosulfonate) used on sealer tracks, and for use on tires raced on clay or dirt tracks. This method can be used to clean tires in conjunction with or prior to use the methods for treating tires, including the examples subsequently described herein.

Example No. 2

Diisononyl Cyclohexanoate

| Dipropoxylated Methanol | 0.00% |
|---|---|
| Diisononyl Cyclohexanoate | 100.00% |

This formulation consisting of the ester, without solvents can be applied to the inside of a tire and the tire is rolled continuously for up 36 hours. A benefit of a formulations with zero VOC Volatile Organic Chemical is that the ester is completely absorbed and modifies the stretch and recovery of the tire in hot weather. This allows for greater corner speed in and out of a turn when compared to an untreated tire.

The following formula is used to calculate the amount used inside a tire. Circumference times tread width divided by 250=the ounces to be added to a tire for absorption In addition to use as a single component ester, the solvent can range from 97% down to 0.00% depending on track type, conditions and tire chosen, and the ester can range from 100% down to 3% depending on track type, conditions and tire chosen. Different conditions will allow for varied ratios of solvent to ester and type of solvent to type of ester, and will result in different performance characteristics that can match track conditions.

One specific example of the use of a specific combination of the use of Diisononyl Cyclohexanoate with a solvent is as follows:

| | |
|---|---|
| Dipropoxylated Methanol | 90.00% |
| Diisononyl Cyclohexanoate | 10.00% |

This mixture can be wiped or rolled on the outside of a tire approximately 20 to 30 minutes prior to starting a race. The benefit of this combination is that it allows use of a low toxicity solvent and an oily ester that is rapidly absorbed into the surface of the tread of a tire to give additional short term modification of the dynamic coefficient of friction that allows for the chemical to substitute for the thermal energy obtained from the actual running of the tire.

Example No. 3

This method will drop the hardness of tires, at room temperature, between 0 and 5 points, depending on the number of coats applied, and is used after tires are cleaned with the formulation of Example No. 2 This method employs the following formulation

| | Percentage by Weight |
|---|---|
| ISOPAR G | 59.50000 |
| BUTYL BENZOATE | 3.00000 |
| DIOCTYL SEBACATE | 9.50000 |
| 2_ETHYLHEXYL BENZOATE | 11.00000 |
| TRIBUTOXYETHYL PHOSPHATE | 9.50000 |
| SOLVENT FLUOROALKYL ACRYLATE RESIN | 5.00000 |
| d_LIMONENE | 2.50000 |
| ** Total Percentage ** | 100.00000 |

ISOPAR G:
SYNTHETIC ISOPARAFFINIC HYDROCARBON (CAS No: 64742_48_9) SYN:
BRANCHED ALIPHATIC HYDROCARBON
BB:
BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER
DOS:
DIOCTYL SEBACATE (CAS No: 122_62_3) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER
2_ETHYLHEXYL BENZOATE (CAS No: 5444_75_7) SYN: OCTYL BENZOATE, 2EH BENZOATE, BENZOIC ACID 2-ETHYLHEXYL ESTER
TBEP:
TRIBUTOXYETHYL PHOSPHATE (CAS No: 78_51_3) SYN: TRIBUTOXYETHYL PHOSPHATE, TRI(2_BUTOXYETHYL)PHOSPHATE, 2 BUTOXYETHANOL PHOSPHATE, TBEP, TRIBUTYL CELLOSOLVE PHOSPHATE PHOSPHORIC ACID TRIS(BUTOXYETHYL)ESTER, TRI(BUTOXYETHYL)PHOSPHATE
F611
MITSUBISHI IDENTIFIER FOR AMBIENT CURE SOLVENT SOLUBLE FLUOROALKYL ACRYLATE RESIN (CAS No. PROPRIETARY) SYN: FLUOROACRYLATE COPOLYMER RESIN—SOLVENT SOLUBLE
d-LIMONENE: (CAS No: 8028-48-6) SYN: ORANGE TERPENE, TERPENE HYDROCARBON, ORANGE RIND STEAM DISTILLATE

On average the hardness is dropped by 2 points when this formulation is employed. This formulation is used to provide dirt repellent for dirt tracks, but it can also be used for asphalt tracks. A single thin coat is sufficient for most circumstances, and it should be allowed to dry fully for most benefit. This formulation can be used as a base coat applied approximately 3 days before the tire is used in a race. A spray bottle, paint roller, a sponge or some other applicator can be used to completely cover the tread of the tire with one or two coats. This formulation is applied only to the outside of the tire and is not used on the inside of the tire because it will not completely pass through. This formulation is not used to soften the tires, but it will nevertheless provide excellent "bite" or grip. This formulation lasts for all heats in a single day and it can increase the life of the tire if used properly. When racing on dirt, the tires should be wiped down between heats. This formulation works on both natural or synthetic rubber tires.

Example No. 4

This method is used to prepare tires for racing on wet or soft dirt tracks, but is not suited for use on cold, dry, slick tracks. This method employs the following formulation:

| | Percentage by Weight |
|---|---|
| DIBASIC ESTER | 5.00000 |
| BUTYL BENZOATE | 15.00000 |
| METHYL BENZOATE | 40.00000 |
| SOY METHYL ESTER | 35.00000 |
| BUTYL CELLOSOLVE BENZOATE | 5.00000 |
| ** Total Percentage ** | 100.00000 |

DBE—DIBASIC ESTER—DUPONT NAME FOR BLEND OF:
DIMETHYL GLUTURATE (CAS No: 1119_40_0)
DIMETHYL ADIPATE (CAS No: 627_93_0)
DIMETHYL SUCCINATE (CAS No: 106_65_0)
BB:
BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER
MB
METHYL BENZOATE (CAS No: 93_58_3) SYN: MB, BENZOIC ACID METHYL ESTER, BENZOIC ACID ESTER of METHANOL, NIOBE OIL
SOY METHYL ESTER
FATTY ACID METHYL ESTER (CAS No. 67784_80_9) SYN: C14-C24 METHYL ESTER, FATTY ACID METHYL ESTER, SOYA METHYL ESTER, METHYL SOYATE

BCB
BUTYL CELLOSOLVE BENZOATE (CAS No: 5451_76_3)
SYN: BUTOXYETHYL BENZOATE, ETHYLENE GLYCOL MONOBUTYL BENZOATE, BENZOIC ACID BUTYL CELLOSOLVE ESTER

This formulation can be used after cleaning the tires with the formulation of Example No. 2. It has been demonstrated that the hardness of the tire, at room temperature, will drop between 5 to 35 points, depending on the number of coats applied. The reduction in hardness is permanent. Five days before use, a spray bottle, paint roller, sponge or other applicator should be used to cover the tread with two or more coats. Each coat is allowed to dry before applying the next coat. This will take about 10 to 20 minutes. For softer tires the number of coats should be increased from 3 to 6. The next day the same process should be repeated, and the process can be again repeated after another 24 hours. This process will last for a full night of racing and can improve tire life for tires made of natural or synthetic rubber. When used with tires racing on dirt, the tires should be wiped down using the formulation of Example No. 3 between racing heats.

Example No. 5

This method uses a formulation that will provide extra sticky tread under cold conditions. This method employs the following formulation:

|  | Percentage by Weight |
| --- | --- |
| ISOPAR G | 27.00000 |
| SOY METHYL ESTER | 9.00000 |
| METHYL BENZOATE | 9.00000 |
| DIBASIC ESTER | 6.00000 |
| DIBUTYL MALEATE | 10.00000 |
| BUTYL BENZOATE | 10.00000 |
| BUTYL CELLOSOLVE BENZOATE | 10.00000 |
| 2-ETHYLHEXYL BENZOATE | 9.00000 |
| d-LIMONENE | 10.00000 |
| ** Total Percentage ** | 100.00000 |

ISOPAR G:
SYNTHETIC ISOPARAFFINIC HYDROCARBON (CAS No: 64742_48_9)
SYN: BRANCHED ALIPHATIC HYDROCARBON
SOY METHYL ESTER
FATTY ACID METHYL ESTER (CAS No. 67784_80_9)
SYN: C14-C24 METHYL ESTER, FATTY ACID METHYL ESTER, SOYA METHYL ESTER, METHYL SOYATE
MB
METHYL BENZOATE (CAS No: 93_58_3) SYN: MB, BENZOIC ACID METHYL ESTER, BENZOIC ACID ESTER of METHANOL, NIOBE OIL
DBE—DIBASIC ESTER—DUPONT NAME FOR BLEND OF:
DIMETHYL GLUTURATE (CAS No: 1119_40_0)
DIMETHYL ADIPATE (CAS No: 627930) DIMETHYL SUCCINATE (CAS No: 106650)
DBM:
DIBUTYL MALEATE (CAS No: 105_76_0) SYN: 2_BUTENEDIOIC ACID DIBUTYL ESTER, BUTYL MALEATE, MALEIC ACID DIBUTYL ESTER
BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER

BCB
BUTYL CELLOSOLVE BENZOATE (CAS No: 5451_76_3)
SYN: BUTOXYETHYL BENZOATE, ETHYLENE GLYCOL MONOBUTYL BENZOATE,
BENZOIC ACID BUTYL CELLOSOLVE ESTER
2ETHYLHEXYL BENZOATE (CAS No: 5444_75_7)
SYN: OCTYL BENZOATE, 2EH BENZOATE, BENZOIC ACID 2-ETHYLHEXYL ESTER
d-LIMONENE: (CAS No: 8028-48-6) SYN: ORANGE TERPENE, TERPENE HYDROCARBON, ORANGE RIND STEAM DISTILLATE

This formulation and method will drop the hardness of the tire, at room temperature, between 15 and 35 points, or an average of 20 points, depending on the number of coats employed. Five days before use, a spray bottle, paint roller, sponge or other applicator should be used to cover the tread with three or more coats. Each coat is allowed to dry for about 10 to 20 minutes before applying the next coat. These steps are repeated the next day, and on a third day if desired. Further softness can require 5 or 6 coats. Twenty four hours before a race, these steps can be repeated for even softer tires. This method is suited for use with natural and synthetic rubber tires.

Example No. 6

This method is best suited for use after the spring rainy season is over and has been shown to drop the hardness of a tire, at room temperature, between 3-25 points with the average being 10 points. This method employs the following formulation.

|  | Percentage by Weight |
| --- | --- |
| DIBASIC ESTER | 58.00000 |
| DIBUTYL MALEATE | 10.00000 |
| 2_ETHYLHEXYL BENZOATE | 17.00000 |
| DIOCTYL SEBACATE | 15.00000 |
| ** Total Percentage ** | 100.00000 |

DBE—DIBASIC ESTER—DUPONT NAME FOR BLEND OF:
DIMETHYL GLUTURATE (CAS No: 1119_40_0)
DIMETHYL ADIPATE (CAS No: 627930)
DIMETHYL SUCCINATE (CAS No: 106650)
DBM:
DIBUTYL MALEATE (CAS No: 105_76_0) SYN: 2_BUTENEDIOIC ACID DIBUTYL ESTER, BUTYL MALEATE, MALEIC ACID DIBUTYL ESTER
2_ETHYLHEXYL BENZOATE (CAS No: 5444_75_7) SYN: OCTYL BENZOATE, 2EH BENZOATE, BENZOIC ACID 2-ETHYLHEXANOL ESTER
DOS:
DIOCTYL SEBACATE (CAS No: 122623) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER

Five days before use, a spray bottle, paint roller, sponge or other applicator should be used to cover the tread with two or more coats. Each coat is allowed to dry before applying the next coat. The process steps for this method are the same as for Example No. 4. Although most often applied from the outside, this formulation can be applied from the inside. One to two ounces are used per tire when applied from the inside of the tire.

Example No. 7

This process is suited for use on asphalt tracks and can also be used for drag racing. It will drop the hardness of a tire, at room temperature, between 5 to 25 points, depending on the number of coats. This method employs the following formulation.

|  | Percentage by Weight |
|---|---|
| ISOPAR G | 61.50000 |
| DIBASIC ESTER | 11.00000 |
| DIBUTYL MALEATE | 11.00000 |
| DIOCTYL SEBACATE | 11.00000 |
| d-LIMONENE | 5.50000 |
| ** Total Percentage ** | 100.00000. |

ISOPAR G:
SYNTHETIC ISOPARAFFINIC HYDROCARBON (CAS No: 64742_48_9)
SYN: BRANCHED ALIPHATIC HYDROCARBON
DBE:
DBE—DIBASIC ESTER—DUPONT NAME FOR BLEND OF:
DIMETHYL GLUTURATE (CAS No: 1119_40_0)
DIMETHYL ADIPATE (CAS No: 627_93_0)
DIMETHYL SUCCINATE (CAS No: 106_65_0)
DOS:
DIOCTYL SEBACATE (CAS No: 122_62_3) SYN: OCTYL SEBACATE,
BIS(2_ETHYLHEXYL)SEBACATE, DOS, DEHS, SEBACIC ACID BIS (2_ETHYLHEXYL)
ESTER, DECANEDIOIC ACID BIS(2_ETHYLHEXYL) ESTER
d-LIMONENE: (CAS No: 8028-48-6) SYN: ORANGE TERPENE, TERPENE HYDROCARBON, ORANGE RIND STEAM DISTILLATE

Five days before a race apply this material too completely cover the tread with 2 or more coats. Allow to dry between coats and repeat the next day. Wrapping the tires is optional. When wrapping, wait until the second night. Wait for the tire to look dry and wrap in dry paper towels and then in a clear plastic wrap. Unwrap at least 24 hours before racing. This formulation can be used as a prerace wipe if allowed to dry.

Example No. 8

This method is suited for use on dirt, and the tires will run cooler on hot dusty tracks. The hardness will be reduced between 0 to 5 points, with the average being 2 points. This method employs the following formulation

|  | Percentage by Weight |
|---|---|
| DIBASIC ESTER | 63.00000 |
| DIOCTYL SEBACATE | 23.00000 |

-continued

|  | Percentage by Weight |
|---|---|
| CYCLIC OLIGOMER PHOSPHONATE | 6.00000 |
| TRIBUTOXYETHYL PHOSPHATE | 7.00000 |
| ** Total Percentage ** | 100.00000 |

DBE:
DBE—DIBASIC ESTER—DUPONT NAME FOR BLEND OF:
DIMETHYL GLUTURATE (CAS No: 1119_40_0)
DIMETHYL ADIPATE (CAS No: 627_93_0)
DIMETHYL SUCCINATE (CAS No: 106_65_0)
DOS:
DIOCTYL SEBACATE (CAS No: 122_62_3) SYN: OCTYL SEBACATE,
BIS(2_ETHYLHEXYL)SEBACATE, DOS, DEHS, SEBACIC ACID BIS (2_ETHYLHEXYL)
ESTER, DECANEDIOIC ACID BIS(2_ETHYLHEXYL) ESTER
CYCLIC OLIGOMERIC PHOSPHONATE
(CAS No. 41203-81-0 and 42595-45-9)
TBEP:
TRIBUTOXYETHYL PHOSPHATE (CAS No: 78_51_3)
SYN: TRIBUTOXYETHYL
PHOSPHATE, TRI(BUTOXYETHYL)PHOSPHATE, 2_BUTOXYETHANOL PHOSPHATE,
TBEP, PHOSPHORIC ACID TRIS(BUTOXYETHYL)ESTER,
TRI(2_BUTOXYETHYL)PHOSPHATE, TRIBUTYL CELLOSOLVE PHOSPHATE When used for cars or go karts, eight to ten days are needed for curing and tires should not be wrapped using this method. On the first night apply 2-4 coats. Allow 1-2 hours for drying between coats. Tires should be stored for eight to ten days after the formulation is applied. This formulation will not appreciably soften the tire, but will give it excellent bite. When used for go karts or similar vehicles dilute this formulation with Naphtha VM &P using 3 parts Naphtha VM &P to one part of this formulation. If used at full strength, this formulation can lock down a go kart, so that the power of the kart cannot overcome the adhesion of the tires to the surface that can be attained with this formulation. This material should be applied only to the outside of a tire. The formulation can be diluted as much as 1 part in 10 and will still be effective.

Example No. 9

This method is intended for use when the temperature falls below 50 degrees F. This method employs the following formulation:

|  | Percentage by Weight |
|---|---|
| d-LIMONENE | 28.00000 |
| AROMATIC 150 ND | 10.00000 |
| PROPOXYMETHYL ACETATE | 30.00000 |
| SOY METHYL ESTER | 9.00000 |
| DIBUTYL MALEATE | 9.00000 |
| BUTYL BENZOATE | 9.00000 |
| DIBASIC ESTER | 3.00000 |
| CYCLIC OLIGOMER PHOSPHONATE | 0.50000 |

-continued

| | Percentage by Weight |
|---|---|
| DIOCTYL SEBACATE | 1.00000 |
| TRIBUTOXYETHYL PHOSPHATE | 0.50000 |
|  Total Percentage  | 100.00000 | d-LIMONENE: (CAS No: 8028-48-6) SYN: ORANGE TERPENE, TERPENE HYDROCARBON, ORANGE RIND STEAM DISTILLATE
AROMATIC 150 ND (CAS No. 64742-94-5) SYN: AROMATIC 150 NAPHTHALENE DEPLETED, HEAVY AROMATIC NAPHTHA NAPHTHALENE DEPLETED
PMA:
PROPYLENE GLYCOL MONOMETHYL ETHER ACETATE (CAS No: 108-65-6) SYN: PROPDXYMETHYL ACETATE, PMA, PGMEA, METHYL PARASOL ACETATE
SOY METHYL ESTER
FATTY ACID METHYL ESTER (CAS No. 67784_80_9) SYN: C14-C24 METHYL ESTER, FATTY ACID METHYL ESTER, SOYA METHYL ESTER, METHYL SOYATE
DBM:
DIBUTYL MALEATE (CAS No: 105_76_0) SYN: 2_BUTENEDIOIC ACID DIBUTYL ESTER, BUTYL MALEATE, MALEIC ACID DIBUTYL ESTER
BB:
BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER
DBE:
DBE—DIBASIC ESTER—DUPONT NAME FOR BLEND OF:
DIMETHYL GLUTURATE (CAS No: 1119_40_0)
DIMETHYL ADIPATE (CAS No: 627_93_0)
DIMETHYL SUCCINATE (CAS No: 106_65_0)
CYCLIC OLIGOMERIC PHOSPHONATE
(CAS No. 41203-81-0 and 42595-45-9)
DOS:
DIOCTYL SEBACATE (CAS No: 122_62_3) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER
TBEP:
TRIBUTOXYETHYL PHOSPHATE (CAS No: 78_51_3) SYN: TRIBUTOXYETHYL PHOSPHATE, TRI(BUTOXYETHYL)PHOSPHATE, 2_BUTOXYETHANOL PHOSPHATE, TBEP, PHOSPHORIC ACID TRIS(BUTOXYETHYL)ESTER, TRI(2_BUTOXYETHYL)PHOSPHATE, TRIBUTYL CELLOSOLVE PHOSPHATE This formulation works well when the formulation of Example No. 5 is used as a base treatment and a track side treatment is also needed. At 40 degrees F., it takes about 15 minutes to dry, but at 65 degrees F. 3 or 4 coats can be applied in less than 20 minutes.

Example No. 10

This method proves more bite, or in other words increases the coefficient of friction between a tire and a surface, without softening the tire. This formulation can be used as a pretreatment in the same manner as in the method of Example No. 8 or it can be used at the track. It is intended for use with go karts. The formulation used in this method is as follows:

| | Percentage by Weight |
|---|---|
| DIBASIC ESTER | 39.00000 |
| PROPOXYMETHYL ACETATE | 5.00000 |
| DIPROPOXYMETHANOL | 5.00000 |
| DIOCTYL SEBACATE | 14.50000 |
| CYCLIC OLIGOMER PHOSPHONATE | 3.20000 |
| TRIBUTOXYETHYL PHOSPHATE | 2.50000 |
| BUTYL BENZOATE | 1.50000 |
| DIBUTYL MALEATE | 2.00000 |
| ISOPAR G | 25.30000 |
| TEXANOL | 2.00000 |
| ** Total Percentage ** | 100.0000 |

DBE:
DBE—DIBASIC ESTER—DUPONT NAME FOR BLEND OF:
DIMETHYL GLUTURATE (CAS No: 1119_40_0)
DIMETHYL ADIPATE (CAS No: 627_93_0)
DIMETHYL SUCCINATE (CAS No: 106_65_0)
PMA:
PROPYLENE GLYCOL MONOMETHYL ETHER ACETATE (CAS No: 108-65-6) SYN: PROPDXYMETHYL ACETATE, PMA, PGMEA, METHYL PARASOL ACETATE
DPM:
DIPROPYLENE GLYCOL MONOMETHYL ETHER (CAS No: 3459094_8) SYN: DIPROPDXYMETHANOL, DPM, DIPROPYLENE GLYCOL METHYL ETHER, DPGME
DOS:
DIOCTYL SEBACATE (CAS No: 122_62_3) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER
CYCLIC OLIGOMERIC PHOSPHONATE
(CAS No. 41203-81-0 and 42595-45-9)
TBEP:
TRIBUTOXYETHYL PHOSPHATE (CAS No: 78_51_3) SYN: TRIBUTOXYETHYL PHOSPHATE, TRI(BUTOXYETHYL)PHOSPHATE, 2_BUTOXYETHANOL PHOSPHATE, TBEP, PHOSPHORIC ACID TRIS(BUTOXYETHYL)ESTER, TRI(2_BUTOXYETHYL)PHOSPHATE, TRIBUTYL CELLOSOLVE PHOSPHATE
BB:
BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER
DBM:
DIBUTYL MALEATE (CAS No: 105_76_0) SYN: 2_BUTENEDIOIC ACID DIBUTYL ESTER, BUTYL MALEATE, MALEIC ACID DIBUTYL ESTER
ISOPAR G:
SYNTHETIC ISOPARAFFINIC HYDROCARBON (CAS No: 64742_48_9) SYN: BRANCHED ALIPHATIC HYDROCARBON
TEXANOL
2,2,4_TRIMETHYL_1,3_PENTANEDIOL MONOISOBUTYRATE
(CAS No: 25265_77_4)
SYN: PROPIONIC ACID, 2_METHYL_, MONOESTER WITH 2,2,4_TRIMETHYL_1,3_PENTANEDIOL, ISOBUTYRIC ACID ESTER WITH 2,2,4_TRIMETHYL_1,3_PENTANEDIOL It should be understood that the precise percentages of the components for each of these representative formulations is in general not critical. Changes in the concentrations of specific esters can result in similar performance. It is rather the selection of the esters and subsidiary components and their resulting effect on such parameters as hardness, adhesion, bite and cleaning that is significant The formulations employed in Examples 2-10, while applied to a surface of the tire are in a form which will allow the ester or esters to penetrate the tire over time to change structural properties of the tire and are not limited to forming films on the surface of the tire for the purpose of merely improving the appearance, such as commercially available tire shines. The esters in these formulations are small enough to penetrate the voids created in by the polymer strands forming the tire. While the esters introduced into the tires, do penetrate the polymer strands, they are not believed to chemically react with the polymers forming part of the tire structure. Introduction of the esters into the tires does however alter bulk properties, such as durometer, and they can alter physical properties, such as adhesion or bite, without significantly reducing the durometer of the tire. Therefore the addition of these ester formulations can increase the adhesion or bite without unduly increasing the rolling resistance, which would result from a decrease in the durometer of the tire.

When applied to a surface of the tire, ester or esters employed herein will change the coefficient of friction (or adhesion) and/or the softness (or hardness) of the tire. These are structural properties and are at least in part bulk properties of a tire. These structural changes would not occur if the formulations merely formed films on the surface of the tire. To effect these bulk structural changes the ester or esters employed herein penetrate the tire. With the exception of Example 1, which is used as a cleaner, and Example 11, which is applied as a thin layer to act as a dirt repellant or act as a base coat and, as previously described, will not completely pass through the tire, these formulations are applied to act on the tire over a period of time of at least 10 minutes per coat and up to 10 days as described with reference to Examples 4-11 before operating the tire on a road surface.

In addition to these formulations, which employ multiple esters, other tire treatment formulations can employ only individual monoesters or diesters, which are small enough to penetrate the polymer structure of a tire to alter the performance of the tire. The following examples, show how such formulations, each containing only one ester, function. These individual ester compositions can be employed after the tire surface has been cleaned, for example according to Example 1.

Example No. 11

Isononyl Isononate

| Branched Aliphatic Hydrocarbon Solvent | 0.00% |
|---|---|
| Isononyl Isononate | 100.00% |

This formulation consisting of the ester, without solvents can be applied to the inside of a tire and the tire is rolled continuously for up 36 hours. A benefit of a forumlations with zero VOC Volatile Organic Chemical is that the ester is completely absorbed and modifies the stretch and recovery of the tire in hot weather. This allows for greater corner speed in and out of a turn when compared to an untreated tire.

The following formula is used to calculate the amount used inside a tire. Circumference times tread width divided by 250=the ounces to be added to a tire for absorption In addition to use as a single component ester, the solvent can range from 97% down to 0.00% depending on track type, conditions and tire chosen, and the ester can range from 100% down to 3% depending on track type, conditions and tire chosen. Different conditions will allow for varied ratios of solvent to ester and type of solvent to type of ester, and will result in different performance characteristics that can match track conditions.

One specific example of the use of a specific combination of the use of Isononyl Isononate with a solvent is as follows:

| Branched Aliphatic Hydrocarbon Solvent | 90.00% |
|---|---|
| Isononyl Isononate | 10.00% |

This mixture can be wiped or rolled on the outside of a tire approximately 20 to 30 minutes prior to starting a race. The benefit of this combination is that it allows use of a low toxicity solvent and an oily ester that is rapidly absorbed into the surface of the tread of a tire to give additional short term modification of the dynamic coefficient of friction that allows for the chemical to substitute for the thermal energy obtained from the actual running of the tire.

There are many instances that the exterior treatment may need to be completed 20 minutes in advance up to several weeks in advance.

Example No. 12

Dioctyl Maleate

| d-Limonene | 0.00% |
|---|---|
| Dioctyl Maleate | 100.00% |

This formulation consisting of the ester, without solvents can be applied to the inside of a tire and the tire is rolled continuously for up 36 hours. Rolling, as recommended, involves rotating the tire at a rate of approximately less than one rpm. A benefit of a formulations with zero VOC Volatile Organic Chemical is that the ester is completely absorbed and modifies the stretch and recovery of the tire in hot weather. This allows for greater corner speed in and out of a turn when compared to an untreated tire. As with other examples, this will increase the dynamic coefficient of friction of the tire.

The following formula is used to calculate the amount used inside a tire. Circumference times tread width divided by 250=the ounces to be added to a tire for absorption In addition to use as a single component ester, the solvent can range from 97% down to 0.00% depending on track type, conditions and tire chosen, and the ester can range from 100% down to 3% depending on track type, conditions and tire chosen. Different conditions will allow for varied ratios of solvent to ester and type of solvent to type of ester, and will result in different performance characteristics that can match track conditions.

One specific example of the use of a specific combination of the use of Dioctyl Maleate with a solvent is as follows:

| d-Limonene | 90.00% |
|---|---|
| Dioctyl Maleate | 10.00% |

This mixture can be wiped or rolled on the outside of a tire approximately 20 to 30 minutes prior to starting a race. The benefit of this combination is that it allows use of a low toxicity solvent and an oily ester that is rapidly absorbed into the surface of the tread of a tire to give additional short term modification of the dynamic coefficient of friction that allows for the chemical to substitute for the thermal energy obtained from the actual running of the tire.

There are many instances that the exterior treatment may need to be completed 20 minutes in advance up to several weeks in advance.

Example No. 13

Dibutyl Maleate

| d-Limonene | 0.00% |
|---|---|
| Dibutyl Maleate | 100.00% |

This formulation consisting of the ester, without solvents can be applied to the inside of a tire and the tire is rolled continuously for up 36 hours. A benefit of a formulations with zero VOC Volatile Organic Chemical is that the ester is completely absorbed and modifies the stretch and recovery of the tire in hot weather. This allows for greater corner speed in and out of a turn when compared to an untreated tire.

The following formula is used to calculate the amount used inside a tire. Circumference times tread width divided by 250=the ounces to be added to a tire for absorption In addition to use as a single component ester, the solvent can range from 97% down to 0.00% depending on track type, conditions and tire chosen, and the ester can range from 100% down to 3% depending on track type, conditions and tire chosen. Different conditions will allow for varied ratios of solvent to ester and type of solvent to type of ester, and will result in different performance characteristics that can match track conditions.

One specific example of the use of a specific combination of the use of Dibutyl Maleate with a solvent is as follows:

| d-Limonene | 90.00% |
|---|---|
| Dibutyl Maleate | 10.00% |

This mixture can be wiped or rolled on the outside of a tire approximately 20 to 30 minutes prior to starting a race. The benefit of this combination is that it allows use of a low toxicity solvent and an oily ester that is rapidly absorbed into the surface of the tread of a tire to give additional short term modification of the dynamic coefficient of friction that allows for the chemical to substitute for the thermal energy obtained from the actual running of the tire.

There are many instances that the exterior treatment may need to be completed 20 minutes in advance up to several weeks in advance.

Example No. 14

Dioctyl Maleate

| Parachlorobenzyotrifluoride (PCBTF) | 0.00% |
|---|---|
| Dioctyl Maleate | 100.00% |

This formulation consisting of the ester, without solvents can be applied to the inside of a tire and the tire is rolled continuously for up 36 hours. A benefit of a formulations with zero VOC Volatile Organic Chemical is that the ester is completely absorbed and modifies the stretch and recovery of the tire in hot weather. This allows for greater corner speed in and out of a turn when compared to an untreated tire.

The following formula is used to calculate the amount used inside a tire. Circumference times tread width divided by 250=the ounces to be added to a tire for absorption In addition to use as a single component ester, the solvent can range from 97% down to 0.00% depending on track type, conditions and tire chosen, and the ester can range from 100% down to 3% depending on track type, conditions and tire chosen. Different conditions will allow for varied ratios of solvent to ester and type of solvent to type of ester, and will result in different performance characteristics that can match track conditions.

One specific example of the use of a specific combination of the use of Dioctyl Maleate with a solvent is as follows:

| Parachlorobenzyotrifluoride (PCBTF) | 90.00% |
|---|---|
| Dioctyl Maleate | 10.00% |

This mixture can be wiped or rolled on the outside of a tire approximately 20 to 30 minutes prior to starting a race. The benefit of this combination is that it allows use of a low toxicity solvent and an oily ester that is rapidly absorbed into the surface of the tread of a tire to give additional short term modification of the dynamic coefficient of friction that allows for the chemical to substitute for the thermal energy obtained from the actual running of the tire.

There are many instances that the exterior treatment may need to be completed 20 minutes in advance up to several weeks in advance.

Example No. 15

Dioctyl Sebacate

| Mineral Spirits Rule 66 | 0.00% |
|---|---|
| Dioctyl Sebacate | 100.00% |

This formulation consisting of the ester, without solvents can be applied to the inside of a tire and the tire is rolled continuously for up 36 hours. A benefit of a formulations with zero VOC Volatile Organic Chemical is that the ester is completely absorbed and modifies the stretch and recovery of the tire in hot weather. This allows for greater corner speed in and out of a turn when compared to an untreated tire.

The following formula is used to calculate the amount used inside a tire. Circumference times tread width divided by 250=the ounces to be added to a tire for absorption In addition to use as a single component ester, the solvent can range from 97% down to 0.00% depending on track type, conditions and tire chosen, and the ester can range from 100% down to 3% depending on track type, conditions and tire chosen. Different conditions will allow for varied ratios of solvent to ester and type of solvent to type of ester, and will result in different performance characteristics that can match track conditions.

One specific example of the use of a specific combination of the use of Dioctyl Sebacate with a solvent is as follows:

| | |
|---|---|
| Mineral Spirits Rule 66 | 90.00% |
| Dioctyl Sebacate | 10.00% |

This mixture can be wiped or rolled on the outside of a tire approximately 20 to 30 minutes prior to starting a race. The benefit of this combination is that it allows use of a low toxicity solvent and an oily ester that is rapidly absorbed into the surface of the tread of a tire to give additional short term modification of the dynamic coefficient of friction that allows for the chemical to substitute for the thermal energy obtained from the actual running of the tire.

There are many instances that the exterior treatment may need to be completed 20 minutes in advance up to several weeks in advance.

There are many instances that the exterior treatment may need to be completed 20 minutes in advance up to several weeks in advance.

The solvent portion of the examples may have any number of substitutes. The solvents listed are only for example. The choice of solvent is limited solely by the solubility of the chosen ester in the solvent.

The solvent may be chosen from petroleum distillates, coal tar distillates, distilled solvents from vegetable matter sources, water and synthetic solvents. The preferred solvents for environmental reasons are vegetable matter distillates, water and synthetic solvents.

The Ester portion of the formulations from the examples are a small number of examples and have many substitutes. The only exceptions are those esters that are so large in structure that either absorption (penetration) does not happen or is impractical. Currently the time limit for absorption is approximately five weeks.

Each of these formulations add esters to a previously manufactured tire instead of extracting esters by using solvents or drawing the existing esters to the surface of the tire.

The invention claimed is:

1. A method of treating a tire to increase the dynamic coefficient of the tire comprising the step of applying a composition consisting essentially of only a single monoester or diester selected from the group consisting of isononyl isonoate, dioctyl maleate, dibutyl maleate and dioctyl sebecate to the tire so that the single monoester or diester penetrates the tire to reside in gaps formed in polymer chains forming the tire.

2. The method of treating the tire according to claim 1 wherein the ester is applied in the absence of solvents to an inside surface of the tire, followed by the step of rolling the tire for a sufficient period to allow the ester to penetrate the tire.

3. The method of treating the tire according to claim 1 wherein the tire is continuously rolled for thirty six hours.

4. The method of treating the tire according to claim 1 wherein the ester is applied with a solvent to an inside surface of the tire, followed by the step of rolling the tire for a sufficient period to allow the ester to penetrate the tire.

5. The method of treating the tire according to claim 1 wherein the ester is applied with a solvent to an exterior surface of the tire at least twenty minutes before using the tire in a race.

6. A method of treating a tire to increase the dynamic coefficient of the tire comprising the step of applying a composition consisting essentially of diisononyl cyclohexanoate as an only ester to a surface of a tire to penetrates the tire to reside in gaps formed in polymer chains forming the tire.

7. The method of treating the tire according to claim 6 wherein the diisononyl cyclohexanoate is applied with a solvent comprising dipropoxylated methanol.

\* \* \* \* \*